United States Patent Office 3,705,848
Patented Dec. 12, 1972

3,705,848
APPARATUS FOR ELECTROCHEMICAL BURRING AND BLUNTING SHARP EDGES OF CURRENT-CONDUCTING ARTICLES
Alexandr Lazarevich Vishnitsky, Grazhdansky prospekt 15, korpus 1, kv. 27; Lev Mironovich Shapiro, Ulitsa Karbysheva 6, korpus 2, kv. 95; Evgeny Andreevich Kazantsev, Ulitsa Sofii Kovalevskoi 14, korpus 2, kv. 19; Benyamin Markovich Shvartsman, Juzhnoe shosse 76, kv. 14; Georgy Petrovich Shilov, Bolshaya Pushkarskaya Ulitsa 23, kv. 28; Evgeny Fedorovich Nemilov, Grazhdansky prospekt 96, korpus 4, kv. 66; Izmail Abdulovich Baisupov, Nevsky prospekt 134, kv. 88; Vasily Fomich Masterov, Ulitsa Krasnaya 41, kv. 10; and Alexandr Stepanovich Rumyantsev, Bukharestskaya Ulitsa 94/1, kv. 287, all of Leningrad, U.S.S.R.
Filed July 22, 1970, Ser. No. 57,167
Int. Cl. C23b 5/78
U.S. Cl. 204—213                                    2 Claims

ABSTRACT OF THE DISCLOSURE

The present invention relates to apparatus designed for electrochemical burring and blunting sharp edges on current-conducting articles.

Figure 1:
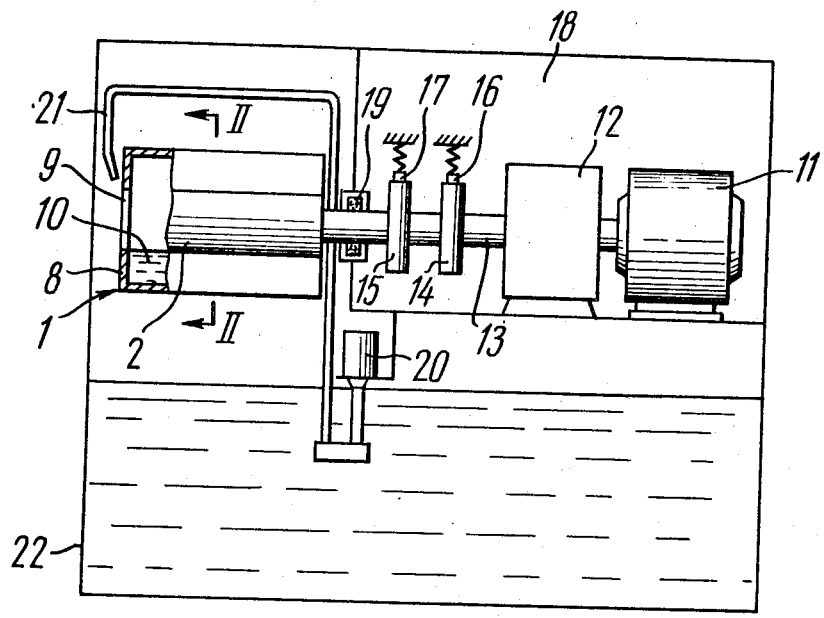

The invention consists in an apparatus comprising a cylinder with electrolyte, in which articles to be treated are placed, and electrodes which form a closed electric circuit through the articles and electrolyte, said electric circuit having, according to the invention, at least two pairs of heteropolar electrodes.

---

The present invention relates to the field of metal treatment by the electrochemical technique and, more particularly, it relates to apparatus designed for electrochemical burring and blunting sharp edges on current-conducting articles.

Known in the art is an apparatus for electrochemical burring and blunting sharp edges on current-conducting articles, comprising a cylinder with electrolyte in which are placed articles to be treated and electrodes which form with the articles and electrolyte a closed electric circuit (cf., U.S.S.R. Inventor's Certificate No. 167,423).

In the apparatus according to the latter Inventor's Certificate, a metal chain passed through the centre of the rotating cylinder is used as anode, and metal plates disposed outside the cylinder are used as cathode, the cylinder and plates being immersed in the electrolyte bath. With a view to intensifying the process of electrochemical treatment, an abrasive is charged to the cylinder in addition to the articles being treated.

However, said known apparatus features a reduced efficiency due to considerable intermediate resistances between the electrodes. A reduction of intermediate resistances by way of increasing the dimensions of the electrode disposed inside the cylinder could only bring about a reduction of its effective volume and, consequently, about a reduction of the apparatus capacity.

It is an object of the present invention to provide an apparatus for electrochemical burring and blunting sharp edges on current-conducting articles that would feature lower intermediate electric resistances while maintaining the same effective volume of the cylinder.

It is another object of the invention to provide an apparatus for electrochemical burring and blunting sharp edges that would feature a higher capacity while maintaining the same size of the cylinder.

Still another object of the present invention is to provide an apparatus for electrochemical burring and blunting sharp edges on current-conducting articles that would feature a lower energy capacity of the process of treating the articles.

Also an object of the invention is to provide an apparatus for electrochemical burring and blunting sharp edges on current-conducting articles that would help reduce the cost of treating the articles.

Said and other objects of the invention can be accomplished in an apparatus for electrochemical burring and blunting sharp edges on current-conducting articles, comprising a cylinder with electrolyte in which articles to be treated are placed, and electrodes forming with the articles and electrolyte a closed electric circuit, in which apparatus, according to the invention, the closed electric circuit has at least two pairs of heteropolar electrodes.

It is expedient that the pairs of heteropolar electrodes be disposed on the cylinders.

The use of the present invention results in an increased capacity of the apparatus for electrochemical burring and blunting sharp edges on current-conducting articles and in a reduced energy capacity of the process of treating the articles.

Figure 2:
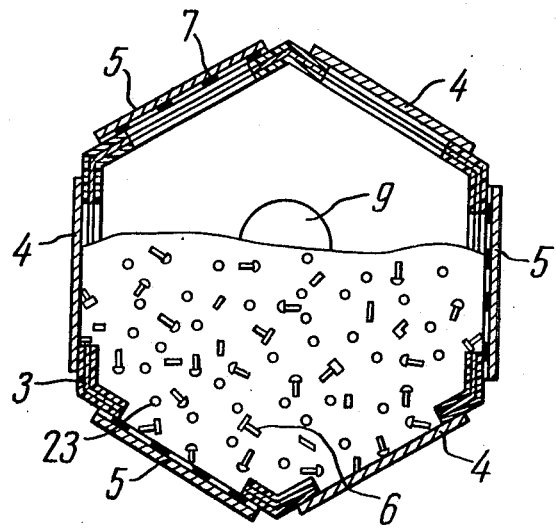

The present invention will be better understood upon examining the following detailed description of the preferred embodiment thereof, reference being had to the accompanying drawings, in which:

FIG. 1 shows schematically an apparatus for eelctrochemical burring and blunting sharp edges, embodying the present invention; and FIG. 2 is a section on the line II—II of FIG. 1.

Now, referring to the drawings, FIG. 1 shows schematically an apparatus 1 designed for electrochemical burring and blunting sharp edges, which is essentially a cylinder 2 featuring an insulated frame 3 (FIG. 2) to which are secured heteropolar electrodes 4 and 5 serving as the side walls of the cylinder 2. The electrodes 5 of like polarity are insulated from articles 6 under treatment by means of an insulating perforated spacer 7. The front wall 8 (FIG. 1) of the cylinder is provided with an opening 9 (FIGS. 1 and 2) through which the articles 6 to be treated are charged and electrolyte 10 (FIG. 1) is supplied. One of the side walls 4 of the cylinder is made collapsible to effect therethrough the discharge of the treated articles 6.

The cylinder 2 is set to rotation by means of an electric motor 11 via reducing gear 12. Disposed on the same shaft 13 with the cylinder are contact rings 14 and 15 connected to the heteropolar electrodes, i.e. anode 4 and cathode 5. Electric current is brought to the contact ring 14 via contact brush 16, and to the contact ring 15—via contact brush 17. The electric motor 11 and reducing gear 12, contact rings 14 and 15 and contact brushes 16 and 17 are disposed in a chamber 18 protected from penetration of the electrolyte 10 by means of a packing 19. The electrolyte 10 is pressure fed to the cylinder 2 by means of a pump 20 via pipeline 21 through the opening 9 in the front wall 8 of the cylinder. Excess electrolyte in the cylinder is drained through the same opening 9 to a bed 22 which serves as a tank for electrolyte.

With a view to intensifying the process of treatment, an abrasive 23 (FIG. 2) is charged to the cylinder 2 together with the articles 6, which serves to intensify the removal of film formed on the surface of the articles under treatment as a result of anodic dissolution.

Following is the operating procedure of the apparatus 1 designed for electrochemical burring and blunting sharp edges, according to the present invention.

The articles 6 to be treated are charged into the cylinder 2 together with the abrasive 23, the pump 20 is actuated and the cylinder is filled with the electrolyte 10. Thereupon, the electric motor 11 is switched on and the cylinder is imparted rotation of from 20 to 60 r.p.m. Then, electric current is supplied to the electrodes 4 and 5.

The electrode 4, the anode, passes electric current and, via the electrolyte 10 and current-conducting articles 6, closes with the electrode 5 which is the cathode. Thus, a closed electric circuit is formed protected from short-circuiting by the perforated insulating spacer 7. Electric current passing through the articles 6 causes anodic dissolution on their surfaces, in particular, on their pointed portions (burrs, sharp edges) where the electric charge accumulates. A film of undissolved fragments, formed as a result of anodic dissolution, is removed to solution under the effect of the articles 6 and abrasive 23 rotating with the cylinder 2. The solution is then removed from the cylinder through the opening 9, and fresh electrolyte is supplied instead. The treatment cycle goes on for 0.5 to 3 hours, depending upon the material of the articles under treatment, size of burrs and nature of the sharp edges. After the treatment of the articles is over, the electric motor 11 is deenergized, current supply to the electrodes 4 and 5 discontinued and the pump 20 switched off. Thereupon, the cylinder is discharged.

Heteropolarity of several pairs of adjacent electrodes, their considerable contacting surface, as well as the insulation of only one group of electrodes, helps reduce the energy capacity of the process and provide conditions for low voltage operation of the apparatus, thanks to the reduction of the distance between heteropolar electrodes and the absence of intermediate resistance from the electrodes to the articles under treatment when supplying electric current.

We claim:

1. An apparatus for the electrochemical burring and sharp edge-blunting of current-conductive articles which are immersed in an electrolyte having an electric current passed therethrough, comprising; a cylindrical member having end wall portions and peripheral side wall portions, said cylindrical member being adapted to receive a quantity of electrolyte and articles to be treated, at least some of said side wall portions forming at least two pairs of heteropolar electrodes of plate-like configuration corresponding to the surface dimensions of said side wall portions; and a source of electric current connected to each of said electrodes so as to form a closed electric circuit when said electrolyte and articles are disposed within said cylinder whereby electric current is passed through the articles to be treated.

2. An apparatus as claimed in claim 1, including perforate plate means of an electrically insulating material extending along the inner surface of the cylinder side wall portions forming electrodes of like polarity, said plate means being adapted to prevent contact between said electrodes and articles being positioned in said cylinder.

References Cited

UNITED STATES PATENTS

| 3,533,928 | 10/1970 | Inoue | 204—213 |
| 3,432,419 | 3/1969 | Vitacco | 204—213 |

FOREIGN PATENTS

| 1,040,869 | 10/1958 | Germany | 204—213 |
| 176,411 | 2/1922 | Great Britain | 204—213 |

JOHN H. MACK, Primary Examiner

W. I. SOLOMON, Assistant Examiner

U.S. Cl. X.R.

204—143 M